(12) United States Patent
Ding

(10) Patent No.: US 7,568,608 B1
(45) Date of Patent: Aug. 4, 2009

(54) ULTRASONIC STIR WELDING PROCESS AND APPARATUS

(75) Inventor: R. Jeffrey Ding, Harvest, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 11/700,972

(22) Filed: Jan. 29, 2007

Related U.S. Application Data

(62) Division of application No. 10/928,877, filed on Aug. 20, 2004, now abandoned.

(60) Provisional application No. 60/525,110, filed on Nov. 25, 2003.

(51) Int. Cl.
*B23K 1/06* (2006.01)
*B23K 20/12* (2006.01)

(52) U.S. Cl. ............... 228/110.1; 228/112.1; 228/1.1; 228/2.1

(58) Field of Classification Search ............... 228/2.1, 228/112.1, 2.3, 110.1, 1.1
See application file for complete search history.

(56) References Cited

U.S. PATENT DOCUMENTS

| | | | | |
|---|---|---|---|---|
| 5,460,317 A | * | 10/1995 | Thomas et al. | 228/112.1 |
| 6,213,379 B1 | * | 4/2001 | Takeshita et al. | 228/112.1 |
| 6,811,632 B2 | * | 11/2004 | Nelson et al. | 156/73.5 |
| 7,121,448 B2 | * | 10/2006 | Subramanian et al. | 228/2.1 |

FOREIGN PATENT DOCUMENTS

WO     WO 01/85383     * 11/2001

\* cited by examiner

*Primary Examiner*—Jessica L Ward
*Assistant Examiner*—Michael Aboagye
(74) *Attorney, Agent, or Firm*—James J. McGroary; Stephen J. Stark

(57) ABSTRACT

An ultrasonic stir welding device provides a method and apparatus for elevating the temperature of a work piece utilizing at least one ultrasonic heater. Instead of relying on a rotating shoulder to provide heat to a workpiece an ultrasonic heater is utilized to provide ultrasonic energy to the workpiece. A rotating pin driven by a motor assembly performs the weld on the workpiece. A handheld version can be constructed as well as a fixedly mounted embodiment.

15 Claims, 2 Drawing Sheets

US 7,568,608 B1

ULTRASONIC STIR WELDING PROCESS AND APPARATUS

CLAIM OF PRIORITY

This application claims the benefit of U.S. Provisional Patent Application No. 60/525,110 filed Nov. 25, 2003. This application is a divisional application from "Ultrasonic Stir Welding Process and Apparatus", application Ser. No. 10/928,877 filed Aug. 20, 2004 now abandoned.

STATEMENT OF GOVERNMENT INTEREST

This invention was made by an employee of the United States Government and may be manufactured and used by or for the Government for governmental purposes without the payment of any royalties thereon or thereof.

BACKGROUND OF THE INVENTION

1. Field of the Invention

The present invention is directed to an ultrasonic stir welding device and method, and more particularly, to a method and device for welding utilizing ultrasonic frequency to provide heat to at least assist in plasticizing a work piece with a stir welding process.

2. Description of Related Art

The general concept of friction stir welding is described in U.S. Pat. No. 5,460,317. Conventional friction stir welding is a process of welding component parts together using frictional heat generated by a non-consumable tool to join work piece sections. The tool includes a pin that is inserted into the joint and a shoulder that is urged against an upper surface of the work piece. The pin and shoulder rotate dependently or as a single entity to generate friction needed to create a plasticized region along the joint for the welding operation.

In the traditional friction stir welding process, a pin tool consisting of a rotating shoulder, rotating pin and high forces are utilized to join material together. The rotating shoulder, in combination with high forces, produces much of the heat utilized to bring the materials into the plastic state. Having the materials in the plastic state is a requirement for successful solid state joining. Normally, the conventional friction stir welding process requires expensive reactive tooling and fixturing. Also, since the shoulder is coupled to the pin in the known friction stir welding technology, (1) the rpm of the pin tool controls the performance of the coupled pin tool and shoulder as well as (2) the pressure of the shoulder against the workpiece are key variables which affect welding performance.

Accordingly, there exists a need for a tool and method for performing stir welding which need not rely primarily on a single unique rpm or rate of revolution to control the coupled stir pin and shoulder, shoulder pressure and heat input.

SUMMARY OF THE INVENTION

An object of the present invention is to provide heating during stir welding utilizing ultrasonic technology.

Another object of the present invention is to provide high frequency "rubbing" to generate energy to bring material into the plastic state.

Another object of the present invention is to reduce the necessity for rotating shoulders requiring expensive reactive tooling to withstand high load rotating conditions in stir welding techniques.

Still another object of the present invention is to provide independently controlled heating and pin tool stirring operations.

Accordingly, a new method and tool for ultrasonic stir welding is provided. The tool includes the use of an ultrasonic heating pack, a rotating pin and a rotating pin motor. The ultrasonic heating pack or heater preferably heats the material to the plastic state and the rotating pin is utilized in combination with the ultrasonic heat pack, i.e., such as before and/or after and or in combination with a rotating pin to weld the material. A second ultrasonic device can also be used to generate ultrasonic energy to heat an opposite side of the weld piece from the direction of insertion of the pin tool in some embodiments.

BRIEF DESCRIPTION OF THE DRAWINGS

The particular features and advantages of the invention as well as other objects will become apparent from the following description taken in connection with the accompanying drawings in which.

DETAILED DESCRIPTION OF THE DRAWINGS

Figure 1:
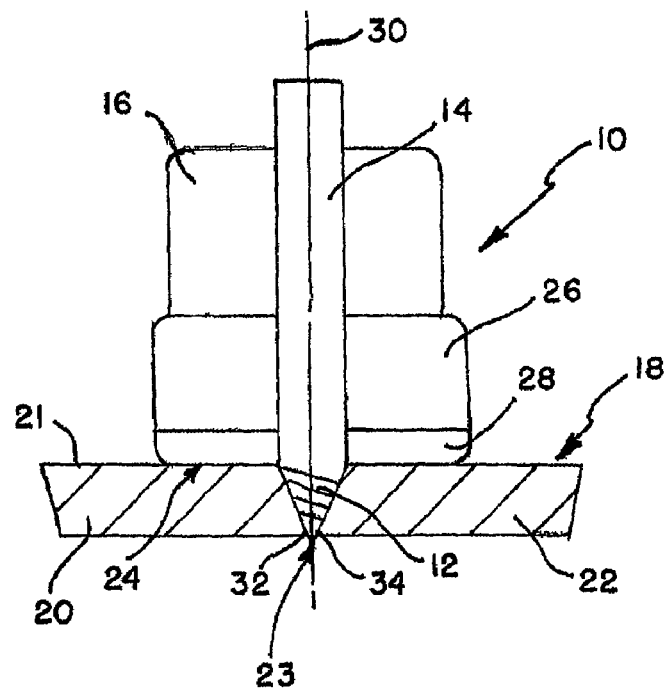
FIG. 1 is a schematic cut away view of a portion of an ultrasonic stir welding device constructed in accordance with the presently preferred embodiment of the present invention.
Figure 2:
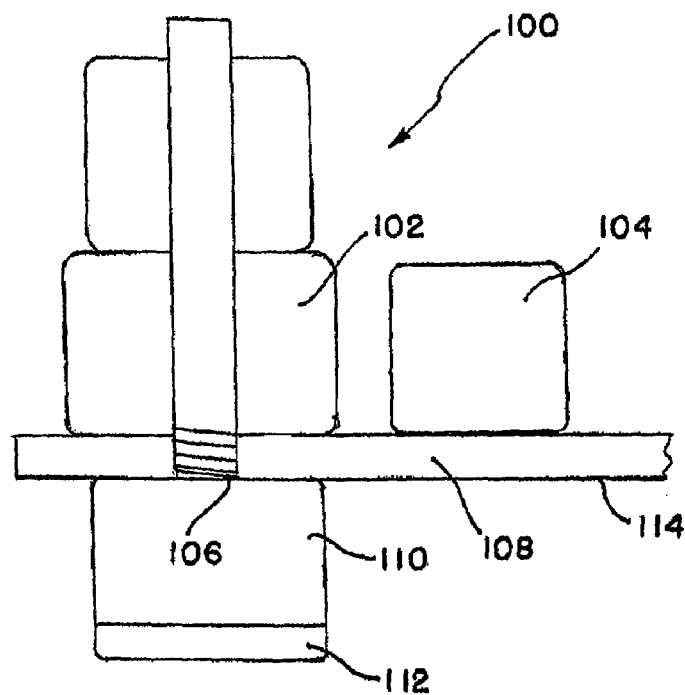
FIG. 2 shows a schematic cut away view of an alternative embodiment of the present invention.
Figure 3:
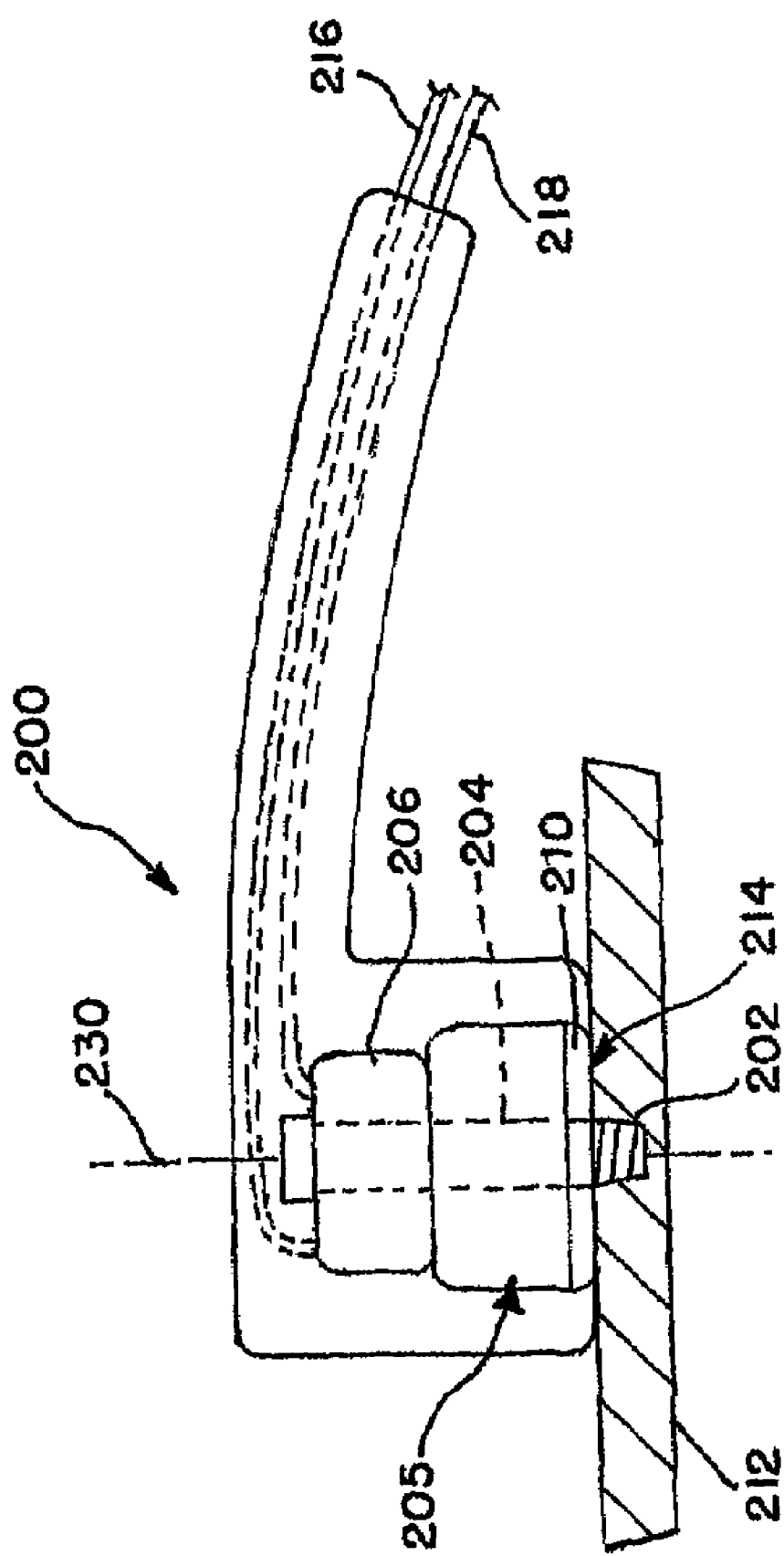
FIG. 3 shows a schematic cut away view of a hand held embodiment of the present invention incorporating the components illustrated in FIG. 1.

FIGS. 1-3 represent at least two embodiments of the present invention. FIG. 1 shows a tool 10 having a rotatable pin 12 connected to a shaft 14 driven by a motor assembly 16. Work piece 18 is illustrated as adjacent members 20,22. As the rotating pin 12 traverses along the work piece 18 it is anticipated that a weld will be formed therealong.

In conventional stir welding, a rotating shoulder would rotate and impart heat to a work piece 18. While the shoulder 24 illustrated certainly is capable of rotating in the alternative embodiments, it is more preferable that ultrasonic heater 26 having a non-rotating shoulder 24 thereon be utilized to generate the energy to impart heat to the work piece 18.

Initial testing has indicated that an ultrasonic stir weld process utilizing an ultrasonic heater 26 produces a metallurgical bond without melting the base metal. The basic heating mechanism in ultrasonic stir welding is high-intensity vibrational energy imparted through the ultrasonic heater 26. High frequency electrical energy is received and/or generated by the ultrasonic heater 26 and converted into mechanical vibration having ultrasonic frequencies. A coupler 28 or a containment plate is useful in transmitting the vibration to the work piece 18 while providing a shoulder 24 to contact an upper surface 21 of the work piece 18.

The tool 10 preferably comprises a rotating pin 12, ultrasonic heater 26 and a motor assembly 16 having a rotating pin motor as a component thereof. The pin 12 preferably has the capability to retract into a containment plate 28 as shown in FIG. 2, the ultrasonic heater 26 as shown in FIG. 1, or other appropriate component of a tool 10, 100 (the embodiment of FIG. 2) and 200 (embodiment of FIG. 3).

In FIG. 1, the pin 12 is shown extending through at least a portion of the ultrasonic heater 26, and more preferably through the center of the ultrasonic heater 26. The pin 12 has a distal end 23 which extends distally of the shoulder 24. The pin 12 is located at distal end 23 of the shaft 14 and may be integrally machined thereon, removably connected thereto, or otherwise connected. The motor assembly 16 also receives the shaft 14 through a center portion of the motor assembly 16 or at least sufficiently enough so that the shaft 14 may be rotatably driven about the rotation axis 30 by the motor assembly 16. Furthermore, the motor assembly 16 may provide the necessary mechanical equipment to withdraw or retract the pin 12 from a work piece 18 such as by retraction into the ultrasonic heater 26 the containment plate 102 shown in FIG. 2 or other appropriate structure.

The containment plate 28 restrains the work piece 18 such as members 20,22 and any plastic or other material as the rotating pin 12 (during operation) stirs the surfaces 32,34 during the welding process and constrains plastic or other material during the welding process. While the ultrasonic heater 26 shown is an integral part of the tool 10,200 in the embodiments of FIGS. 1 and 3, in the embodiment of FIG. 2, the ultrasonic heater 104 may be adjacent or even spaced relative to the pin 106 as shown. In the embodiment of FIG. 2, the ultrasonic heater 104 may act as a pre-heater or a post-heater. In the embodiment of tool 100 shown in FIG. 2, the containment plate 102 is helpful to contain stirred material such as work piece 108 displaced by pin 106 as the material is stirred. As shown in FIG. 2, the ultrasonic heater 104 can be used to heat the material prior to being stirred with the rotating pin 106.

The ultrasonic heater 104 can be the same type heaters utilized in ultrasonic welding. Ultrasonic vibration is typically generated with a transducer and vibration is typically transmitted through a coupling system or sonotrode. Accordingly, the heater is used to transmit vibrational energy into the work piece 18. The frequencies normally utilized with ultrasonic heaters are usually in the range of 10 to 75 kilohertz. Often one or more transducers convert high frequency electrical energy into mechanical vibratory energy of the same frequency. This vibration energy is transmitted through the sonotrode into the work piece. A localized temperature rise is believed to be experienced from the combined effects of elastic hysteresis, localized interfacial slip, and plastic deformation.

As shown in FIG. 1, the ultrasonic heater 26 could be integrated with the pin 12 so that the pin 12 vibrates with or independent of the shoulder 24 during operation. In FIG. 2, the ultrasonic heater 104 can also be located after the rotating pin 12, i.e., such as moving from leftwardly across the page as opposed to rightwardly across the page to provide additional heating or to enhance a design of a surface finish. Accordingly, the ultrasonic heater 26,104 can be utilized in various combinations such as before the rotating pin 12, after the rotating pin 12, and/or in combination with the rotating pin, and/or proximate to the rotating pin 12.

The ultrasonic heater 26,104 can also be utilized to ultrasonically weld the material before it is stirred with the rotating pin 12. As shown in FIG. 2, an anvil 110 can be equipped with a second ultrasonic heater 112 to impart vibration to a back surface 114 of a work piece 108 to assist in the heating process. Other geometrical configurations, can also be utilized to use ultrasonic energy to heat the work piece 108 for different purposes and locations.

FIG. 3 shows an ultrasonic stir weld tool 200 in a hand held embodiment having similar mechanical features as the tool 10 detail shown in FIG. 1. Namely, a pin 202 is connected to a shaft 204. The shaft 204 is driven by a motor assembly 206. In this embodiment the containment plate 210 is shown intermediate the ultrasonic heater 205 and the work piece 212. The containment plate 210 has the shoulder 214 which contacts the work piece 212. The containment plate 210 with the shoulder surface could be a portion of the heater 26 as shown in FIGS. 1 and 3. Separate components could be utilized to provide the containment plate 210, shoulder 214 and/or heater 205 and other embodiments. The tool 200 shown in FIG. 3 is believed to perform exceptionally well with thin material such as less than 0.1 inch thick.

Coolant lines 216 and electrical connection lines 218 can be utilized to cool various portions of the tool 200 and provide energy necessary to rotate the pin 200 as well as displace it relative to the shoulder 214 such as distally beyond the shoulder 214 or proximal to the shoulder 214 (withdrawn internal to containment plate 210 or farther). Coolant and electrical connection conductions 216,214 may not be necessary in all embodiments. In fact, by providing a significant source of energy such as a battery, it is possible that a completely hand-held device may be utilized and have advantageous applications such as applications in space or otherwise.

Furthermore, just like a hand held type device is shown in the embodiment of the tool 200 shown in FIG. 3, other devices could also be utilized for other applications. A much sturdier unit with clamping and holding fixtures could be utilized for thicker materials such as greater than 0.1 inches thick. Portability could be desirous in some embodiments. Fixed in placed units could be utilized in an industrial setting or otherwise. The ultrasonic heaters 26,104,205 can utilize rollers that vibrate and/or heat using resistance heating or other mechanism in order to provide the ultrasonic frequency to the work pieces 18, 108,212 as illustrated. Additional rollers can be utilized in combination with the ultrasonic heaters 26,104, 205.

The work pieces illustrated can also be preheated utilizing an induction coil or other ultrasonic heaters, lasers, etc. Preheating could be performed in series, in parallel or otherwise with an ultrasonic heater 26,104,205 which heats the respective work pieces before it is stirred by the respective pins.

By utilizing the ultrasonic heaters 26,104,205 instead of relying solely on a rotating shoulder, what is believed to be a high quality surface finish can be provided for NDE (Non Destructive Examination) processes. Furthermore, by heating and stirring independently, the resulting strain rate from a rotating pin and temperature can likely be controlled in such a way that super plastic material can be created and welded. There may be numerous commercial applications for the tool and method of utilizing a method of welding shown and described herein. Robotic application such as by providing a tool on a robotically controlled arm can be very advantageous in commercial applications.

Numerous alterations of the structure herein disclosed will suggest themselves to those skilled in the art. However, it is to be understood that the present disclosure relates to the preferred embodiment of the invention, which is for purposes of illustration only, and not to be construed as a limitation of the invention. All such modifications, which do not depart from the spirit of the invention, are intended to be included within the scope of the appended claims.

Having thus set forth the nature of the invention, what is claimed herein is:

1. A method of welding comprising:
   providing a rotatable pin located on a distal end of a shaft having a rotation axis,
   a motor assembly operably coupled to the shaft, said motor assembly imparting rotation to the shaft about the rotation axis;
   a shoulder located proximal of a distal end of the pin; and
   an ultrasonic heater located proximate to the pin;
   providing two metal work pieces adjacent to one another;

activating the ultrasonic heater wherein the ultrasonic heater provides sufficient energy to ultrasonically weld the two metal workpieces to provide a metal weld independent of heat provided by rotation of the pin; and simultaneously rotating the pin to stir the metal weld.

2. A method of welding comprising:
providing a rotatable pin located on a distal end of a shaft having a rotation axis,
a motor assembly operably coupled to the shaft, said motor assembly imparting rotation to the shaft about the rotation axis;
a shoulder located proximal of a distal end of the pin; and
an ultrasonic heater located proximate to the pin and intermediate the motor assembly and the shoulder;
providing two metal work pieces adjacent to one another;
activating the ultrasonic heater wherein the ultrasonic heater provides sufficient energy to heat at least one workpiece to at least a plastic state independent of heat provided by rotation of the pin: and rotating the pin to stir a metal weld, and the energy from the ultrasonic energy is at least partially directed through the shoulder.

3. The method of claim 2 further comprising the step of at least one of
(a) ultrasonically welding the two metal workpieces before stirring to provide the metal weld;
(b) pre-heating the two metal workpieces with the ultrasonic heater; and
(c) post heating the metal weld with the ultrasonic heater.

4. The method of claim 2 wherein the motor assembly further comprises a retractor wherein the pin can be retracted proximally relative to the shoulder and extended distally relative to the shoulder and the pin is extended during stirring of the metal weld.

5. The method of claim 4 wherein when the pin is retracted during at least a portion of the heating step.

6. The method of claim 2 wherein at least one of the two metal work pieces has an upper surface and the shoulder contacts the upper surface during welding of the at least one metal work piece, and the ultrasonic heater imparts ultrasonic energy into at least a portion of the at least one metal work piece.

7. The method of claim 5 further comprising an anvil opposite the at least one metal work piece from the pin, and a second ultrasonic heater directing ultrasonic energy into the workpiece from the second ultrasonic heater when activated.

8. A method of welding comprising:
providing a rotatable pin located on a distal end of a shaft having a rotation axis,
a motor assembly operably coupled to the shaft, said motor assembly imparting rotation to the shaft about the rotation axis;
a shoulder located proximal of a distal end of the pin; and
an ultrasonic heater located proximate to the pin with the shaft extending through a portion of the heater;
providing two metal work pieces adjacent to one another;
activating the ultrasonic heater wherein the ultrasonic heater provides sufficient energy to heat at least one workpiece to at least a plastic state independent of heat provided by rotation of the pin; and rotating the pin to stir a metal weld, and the energy from the ultrasonic energy is at least partially directed through the shoulder.

9. The method of claim 8 further comprising a cooling conduit providing cooling with a coolant during the step of welding to at least one of the motor assembly and ultrasonic heater.

10. The method of claim 8 further comprising a containment plate, said shoulder forming a distal portion of the containment plate and ultrasonic energy passing through at least a portion of the containment plate during the step of heating.

11. The method of claim 8 wherein the shoulder remains stationary while the pin stirs the metal weld.

12. A method of ultrasonic stir welding a metal work piece comprising:
providing a stir weld tool having
a rotatable pin located on a distal end of a shaft having a rotation axis;
a motor assembly operably coupled to the shaft, said motor assembly imparting rotation to the shaft about the a rotation axis;
a shoulder located proximal of a distal end of the of pin;
an ultrasonic heater located proximate to the pin intermediate the motor assembly and the shoulder, said heater directing ultrasonic energy upon activation at least substantially parallel to the rotation axis; and
placing the pin of the tool in contact with a metal work piece;
activating the ultrasonic heater and directing ultrasonic energy into the metal work piece through at least a portion of the shoulder; and then rotating the pin to a sufficient speed to weld a portion of the metal work piece.

13. The method of claim 12 wherein the step of directing ultrasonic energy into the metal work piece occurs before the welding of the portion of the work piece.

14. The method of claim 13 wherein the step of directing ultrasonic energy into the metal work piece occurs after the welding of the portion of the metal work piece.

15. The method of claim 12 wherein the step of directing ultrasonic energy into the metal work piece occurs after the welding of the portion of the metal work piece.

* * * * *